H. C. LYNCH.
BOX CAR DOOR FASTENER AND SPARK ARRESTER.
No. 10,855. Reissued Aug. 9, 1887.
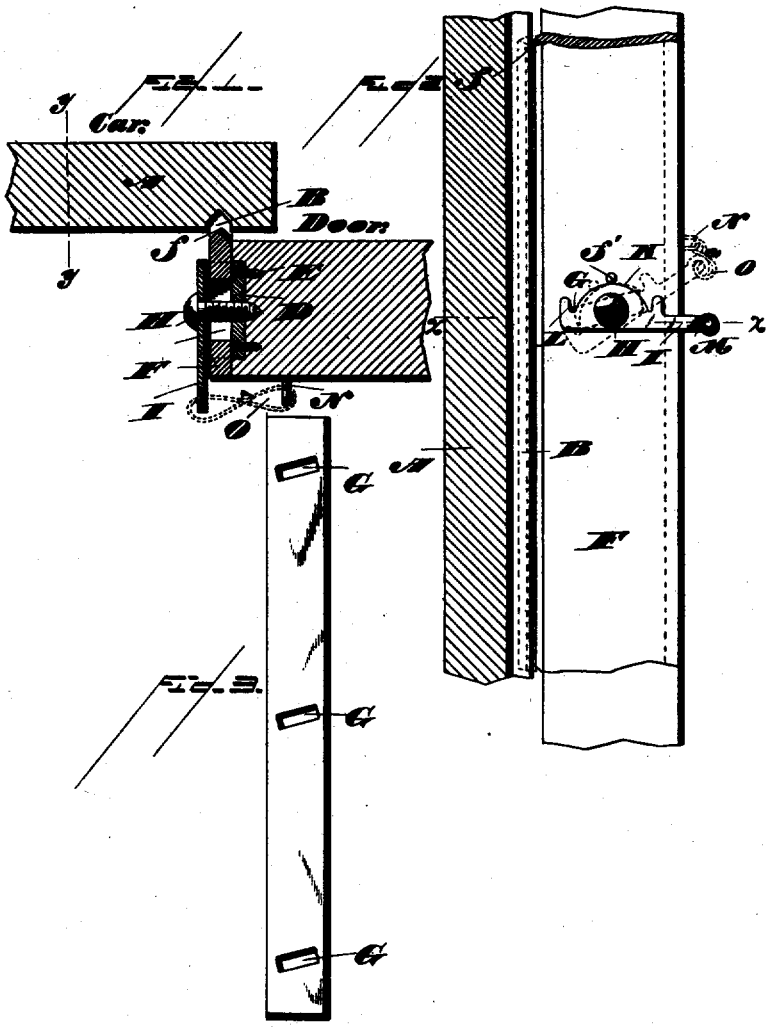
Witnesses
C. W. Deshler.
E. G. Siggers
Inventor
H. C. Lynch.
By his Attorneys
C. A. Snowden
N. PETERS, Photo-Lithographer, Washington, D. C.

UNITED STATES PATENT OFFICE.

HUBBARD CALHOUN LYNCH, OF HOUSTON, TEXAS.

BOX-CAR-DOOR FASTENER AND SPARK-ARRESTER.

SPECIFICATION forming part of Reissued Letters Patent No. 10,855, dated August 9, 1887.

Original No. 351,114, dated October 19, 1886. Application for reissue filed January 17, 1887. Serial No. 224,611.

*To all whom it may concern:*

Be it known that I, HUBBARD CALHOUN LYNCH, of the city of Houston, county of Harris, State of Texas, have invented a new and improved mode of preventing sparks or fire from entering box-cars through the back edge of the door, and at the same time forming a lock or fastener; and I do hereby declare that the following is a full and exact description thereof, reference being had to the accompanying drawings, and to the letters of reference marked thereon.

My invention relates to an improvement in door-fasteners and spark-arresters for box-cars; and it consists in the peculiar construction and combination of devices, that will be more fully set forth hereinafter, and particularly pointed out in the claims.

My invention is designed to be exclusively applied to that class of cars which employ laterally-sliding doors; and it has for its object to combine in a single device, first, means for preventing sparks or fire from entering the car through the crack left by the door, and, second, means for locking the door from sliding laterally, both ends being accomplished by the same movement of the said device.

In the drawings, Figure 1 is a horizontal section through a portion of the car-door and one side of the car, taken on the line *x x* of Fig. 2, and illustrating my improved door-fastener and spark-arrester. Fig. 2 is an elevation of the same, showing the front edge of the car-door provided with my improvements, the side of the car being illustrated in transverse section on the line *y y* of Fig. 1. Fig. 3 is a detailed elevation of the fastening-strip.

A represents the side of the car, which is provided with a vertical groove, B.

C represents the usual laterally-sliding door with which the box-car is provided. On the front edge of the door are secured a number of metallic plates, D, which are countersunk in the door, so that their faces are flush with the front edge thereof, and the said plates are secured to the door by means of screws E. These plates D are arranged at suitable distances apart, and any desired number thereof may be employed. Three are usually sufficient—one near the top and bottom of the door and one at the center thereof. Each plate D is provided with a central interiorly-threaded opening, *d*.

F represents a metallic-strip, which corresponds in length to the height of the car-door, and is of suitable thickness, generally about a quarter of an inch. The width of this strip should preferably slightly exceed the thickness of the car-door, and the inner edge of the said strip is preferably beveled, as at *f*.

G represents transverse oblique openings or slots which are made in the strip, and at such a distance apart as to coincide with the openings *d* of the plates D. Screws H extend through the said slots G, engage the openings in the plates D, and enter the front edge of the car-door, and thus secure the strip to the latter, and permit the strip to be moved laterally across the edge of the door toward or from the contiguous side of the car. On the screw H, at the center of the strip, is pivoted a lever, I, which is provided with a curved cam, K, stops L at each end of the cam, and an operating-arm, M, which projects outwardly beyond the sides of the door. From the front side of the strip F projects a stud, *f'*, which bears against the edge of the cam K. A staple, N, is driven in the car-door at a suitable distance above the central screw, H.

The operation of my invention is as follows: When the car-door is closed, in order to lock the same it is only necessary to grasp the arm M of the lever I and move it upwardly, so as to cause one of the stops L to strike against the stud *f'*, and thus force the strip F inwardly on the edge of the car-door and cause the beveled edge of the strip to enter the groove B. This effectually closes the crack between the door and the side of the car, and also fastens the door from lateral movement, so that it cannot be moved without first withdrawing the strip from the groove B. When the strip is forced into the said groove, a wire, O, or the like is passed through the staple N and through an opening or eye at the outer end of the cam-lever, and the ends of said wire are twisted together, as illustrated in Fig. 2 in dotted lines, and thereby the cam-lever is firmly secured in position and the door is fastened.

Any other suitable preferred means may be employed for locking the cam-lever, as I do not desire to limit myself in this particular.

The function of the plates D is to prevent the metallic strip F from wearing the front edge of the door.

In defining the nature, scope, and advantages of my invention as required by the law, I would state that heretofore it has been proposed to provide a car with a vertical groove and the sliding door with a hinged automatic flap, the latter being adapted to engage the groove in the car, so as to close the crack between the door and the car, and thus exclude the entrance of sparks into the car; but this device was not designed and could not be adapted to lock the door at the same time, and hence has no bearing on the improvement which I claim.

I am aware that it has also been proposed to provide the door-opening of a car with a grooved plate and its vertically-movable door with a catch-bar, D, fitted to the outer side of the door near one edge, which catch-bar was designed to be operated by an eccentric lever to throw the front edge of the bar into the groove of the plate. I am also aware that it is old to provide a weather-strip for car-doors consisting of a vertical strip placed along the edge of a car-door and provided with rollers to bear against the face of the car, said strip being provided with springs to keep the rollers pressed against the car, the latter being grooved or provided with a vertical depression to receive a portion of the roller. This arrangement was not designed to lock the car-door, and could not be constructed to do so. My device not only serves as a weather-strip or spark-arrester for the car-door, but also forms an efficient lock for the door, and this double function in the particular combination recited is what I claim.

In my invention the door is locked simply by the edge of the locking-strip fitting into a groove of the car-door, and whether the edge of the locking-strip be beveled or plain the locking is in nowise affected. In my device the locking occurs simply by the edge of the locking-strip occupying the space on the car provided by the groove, and since the locking-strip is arranged and works at right angles to the edge of the door, when received into the groove of the car, the door cannot move laterally, which is the only direction in which it could otherwise move.

Having thus described my invention, I claim—

1. In combination with the car provided with the groove B and the car-door, the screws H, extending therefrom, the strip F, provided with inclined slots G to receive the screws H, the lever I, pivoted on the screw outside the strip, stops L, provided on the lever, and projections $f'$, extending from the strips, and against which projections the stops L engage, as set forth.

2. In cars of that class which employ horizontally-sliding doors, the combination, with the car provided with a vertical groove, B, of the sliding door and the vertical locking-strip F, provided along the front edge of the door and having its width preferably exceeding (more or less) the thickness of the door, said locking-strip being thus arranged and moving at right angles to the plane of movement of the door, and adapted to be positively operated to throw a portion of the length of the strip beyond the inner side of the door and cause the inner edge of the strip to occupy the groove B, and thus hold the car-door from moving, and at the same time close the crack between the door and the car.

3. In combination with the car provided with the groove B, the car-door, the screws H, extending therefrom, the strips F, having the inclined slots received on the screws, and provided with the projections $f'$, the lever I, pivoted on screws H outside the strip, stops L on the lever to engage the projections $f'$, and means—such as cord—for locking the lever I, as set forth.

4. In cars of that class which employ horizontally-sliding doors, the car provided with a groove, B, in combination with the sliding door, and the vertical locking-strip F, provided along the front edge of the door, and held, when unlocked, with its rear or inner edge substantially flush with the inner edge of the door, so as not to impede the free movement of the door, said locking-strip being moved bodily from end to end at right angles to the plane of movement of the car-door, and an operating-lever to cause the throwing of a portion of the length of the strip beyond the inner side of the door and cause the projected edge of the strip to occupy the groove B, and thus hold the car-door from moving, and at the same time close the crack between the door and the car.

5. In cars of that class which employ horizontally-sliding doors, the car provided with a vertical groove, B, in combination with the horizontally-sliding door, and the combined locking and weather strip movably fitted along the front edge of the door, and the operating devices to move the locking-strip at right angles to the plane of movement of the door and cause a portion of the locking-strip along the inner edge thereof to occupy the groove B, and locking means to hold the operating devices from being thrown back, as set forth.

HUBBARD CALHOUN LYNCH.

Witnesses:
B. O'MALLEY,
JAS. A. RAILEY.